(12) United States Patent
Kim

(10) Patent No.: US 6,301,098 B1
(45) Date of Patent: Oct. 9, 2001

(54) BOOK-SHAPED INFORMATION TERMINAL

(75) Inventor: Jung-Hoon Kim, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/167,581

(22) Filed: Oct. 7, 1998

(30) Foreign Application Priority Data

Oct. 7, 1997 (KR) .................................................. 97-51320

(51) Int. Cl.[7] ........................................................ H05K 5/00
(52) U.S. Cl. .................... 361/680; 361/683; 361/681; 361/625; 206/320; 190/100; 190/900; 190/902
(58) Field of Search ............................. 361/680, 681–686, 361/625; 312/223.2, 223.1, 827; 206/45.23, 320, 305, 576; 190/100, 102, 112, 900, 902

(56) References Cited

U.S. PATENT DOCUMENTS

| | | |
|---|---|---|
| 5,105,338 * | 4/1992 | Held .................................. 361/683 |
| 5,217,119 * | 6/1993 | Hollingsworth ..................... 206/583 |
| 5,278,779 * | 1/1994 | Conway et al. ................... 364/708.1 |
| 5,445,266 * | 8/1995 | Prete et al. ........................... 206/320 |
| 5,607,054 * | 3/1997 | Hollingsworth ..................... 206/320 |
| 5,729,480 * | 3/1998 | Katoh et al. ..................... 364/709.12 |
| 5,971,148 * | 10/1999 | Jackson ............................... 206/320 |
| 6,078,407 * | 6/2000 | Ma ....................................... 358/474 |
| 6,212,067 * | 4/2001 | Nakajima et al. .................... 361/681 |

* cited by examiner

*Primary Examiner*—Leo P. Picard
*Assistant Examiner*—David Foster
(74) *Attorney, Agent, or Firm*—Robert E. Bushnell, Esq.

(57) ABSTRACT

The present invention relates to a book-shaped information terminal, and an object of the present invention is to help users to conveniently carry and use a portable computer like a book, as it constitutes an information terminal as a portable computer in such a shape as a book. The present invention comprises an armoring cover which can be opened and closed, a thin film display unit attached and fixed on one side and a main body attached and fixed to another side, opposite to the thin film display unit when the information terminal is folded like a book.

20 Claims, 6 Drawing Sheets

BOOK-SHAPED INFORMATION TERMINAL

CLAIM OF PRIORITY

This application makes reference to, incorporates the same herein, and claims all benefits accruing under 35 U.S.C. § 119 from an application entitled BOOK-SHAPED INFORMATION TERMINAL earlier filed in the Korean Industrial Property Office on the Oct. 7, 1997, and there duly assigned Ser. No. 97-513220, a copy of which is annexed hereto.

BACKGROUND OF THE INVENTION

1. Technical Field

The present invention relates to a book-shaped information terminal, and more particularly relates to a book-shaped information terminal that corresponds to a portable computer, which is designed to be used in such a shape as a hardcover-bound book.

2. Related Art

Computer systems are information handling systems that are utilized by many individuals and businesses today. A computer system can be defined as a microcomputer that includes a central processing unit (CPU), a volatile memory, a non-volatile memory, a display monitor, a keyboard, a mouse or other input device such as a trackball, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

Portable computers are often referred to as laptop, notebook, or subnotebook computers. These computers typically incorporate a flat panel display such as a liquid crystal display (LCD) or other relatively small display. Portable computers also often provide for coupling to a conventional standalone display monitor.

Generally speaking, a personal computer is classified as a desktop computer or a portable computer. A desktop computer is intended to be used at a fixed place, while a portable computer is designed to be used at a multitude of places, because of the ease with which it can be moved to almost any place.

Accordingly, a portable computer can be developed and supplied, smaller and more convenient in portability, having any form in a range from a form of a notebook computer to that of a hand held computer. Such a portable computer is designed to have a size enabling a user to simply control it by hand, particularly so that it can be conveniently used when being carried to any remote place, because it offers also the general function of a conventional desktop computer.

But such a portable computer has disadvantages. Such a portable computer has external and internal features which cause inconvenience to users. I have found that when a user familiar with carrying a book attempts to carry and use such a portable computer, the user experiences discomfort and inconvenience on account of the carrying and using of the portable computer.

Accordingly, I have discovered that it would be desirable to improve on the form of an information system in order to enable it to be more convenient to carry and use.

SUMMARY OF THE INVENTION

Accordingly, in order to overcome such drawbacks in the related art, it is therefore an object of the present invention to provide a book-shaped information terminal, which can be used and opened like a book in inner constitution, and has an external shape of a hard cover bound book.

To achieve these and other advantages and in accordance with the purpose of the present invention, as embodied and broadly described, there is provided a book-shaped information terminal, which comprises an armoring cover being opened and closed, while a thin film display unit being attached and fixed on one side and a main body attached and fixed to another side in order to put opposite to the thin film display unit attached and fixed to one side of said armoring cover, when folded.

To achieve these and other objects in accordance with the principles of the present invention, as embodied and broadly described, the present invention provides a book-shaped information apparatus, comprising: a cover having a first inside surface coupled to a second inside surface, said inside surfaces being aligned and facing each other when said cover is in a closed position, said inside surfaces not facing each other when said cover is in an open position; a video display unit conveying varying visual information to a user, said video display unit being secured to said first inside surface of said cover; a main unit processing data including the visual information, said main unit being secured to said second inside surface of said cover and being electrically coupled to said video display unit; a hinge unit disposed between said main unit and said video display unit, said hinge unit being secured to said main unit; and a keyboard rotatably mounted to said hinge unit, wherein said keyboard can be rotated in a first direction toward said video display unit and can be rotated in a second direction toward said main unit.

To achieve these and other objects in accordance with the principles of the present invention, as embodied and broadly described, the present invention provides a book-shaped computer apparatus, comprising: a cover having a first inside surface coupled to a second inside surface, said first and second inside surfaces being aligned and facing each other when said cover is in a closed position, said inside surfaces not facing each other when said cover is in an open position; a video display unit conveying varying visual information to a user; a system unit processing data including the visual information, said system unit being electrically coupled to said video display unit; a flexible member formed at said cover in a location where said first inside surface is coupled to said second inside surface, said flexible member enabling said cover to be folded to place said cover in the closed position, and said flexible member enabling said cover to be unfolded to place said cover in the open position; and a hinge unit being mounted to said cover adjacent to said flexible member, said video display unit being rotatably mounted to said hinge unit such that said video display unit can be rotated in a first direction toward said first inside surface and can be rotated in a second direction toward said second inside surface, said system unit being rotatably mounted to said hinge unit such that said system unit can be rotated in said first and second directions independent of said video display unit.

To achieve these and other objects in accordance with the principles of the present invention, as embodied and broadly described, the present invention provides an information apparatus, comprising: a protective cover having a first inside surface and a second inside surface, said surfaces coupled to each other with a flexible member formed in said cover; a video display unit conveying varying visual information to a user and being secured to said first inside surface of said cover; a system unit processing data including the visual information and being secured to said second inside surface of said cover, said system unit being electrically coupled to said video display unit; a hinge unit mounted to said system unit; a keyboard rotatably mounted to said hinge unit and electrically coupled to said system unit; and a holding unit removably mounted to said cover, said holding unit receiving and securing a plurality of writing utensils and recordable media.

The present invention is more specifically described in the following paragraphs by reference to the drawings attached only by way of example. Other advantages and features will become apparent from the following description and from the claims.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

It will be apparent to those skilled in the art that various modifications can be made in a book-shaped information terminal of the present invention, without departing from the spirit of the invention. Thus, it is intended that the present invention cover such modifications as well as variations thereof, within the scope of the appended claims and their equivalents. In the following description of the various embodiments of the present invention, it should be noted that the same reference numerals are used in the drawings where the referenced element has the same function or operation to further aid an understanding of the present invention.

Figure 1:
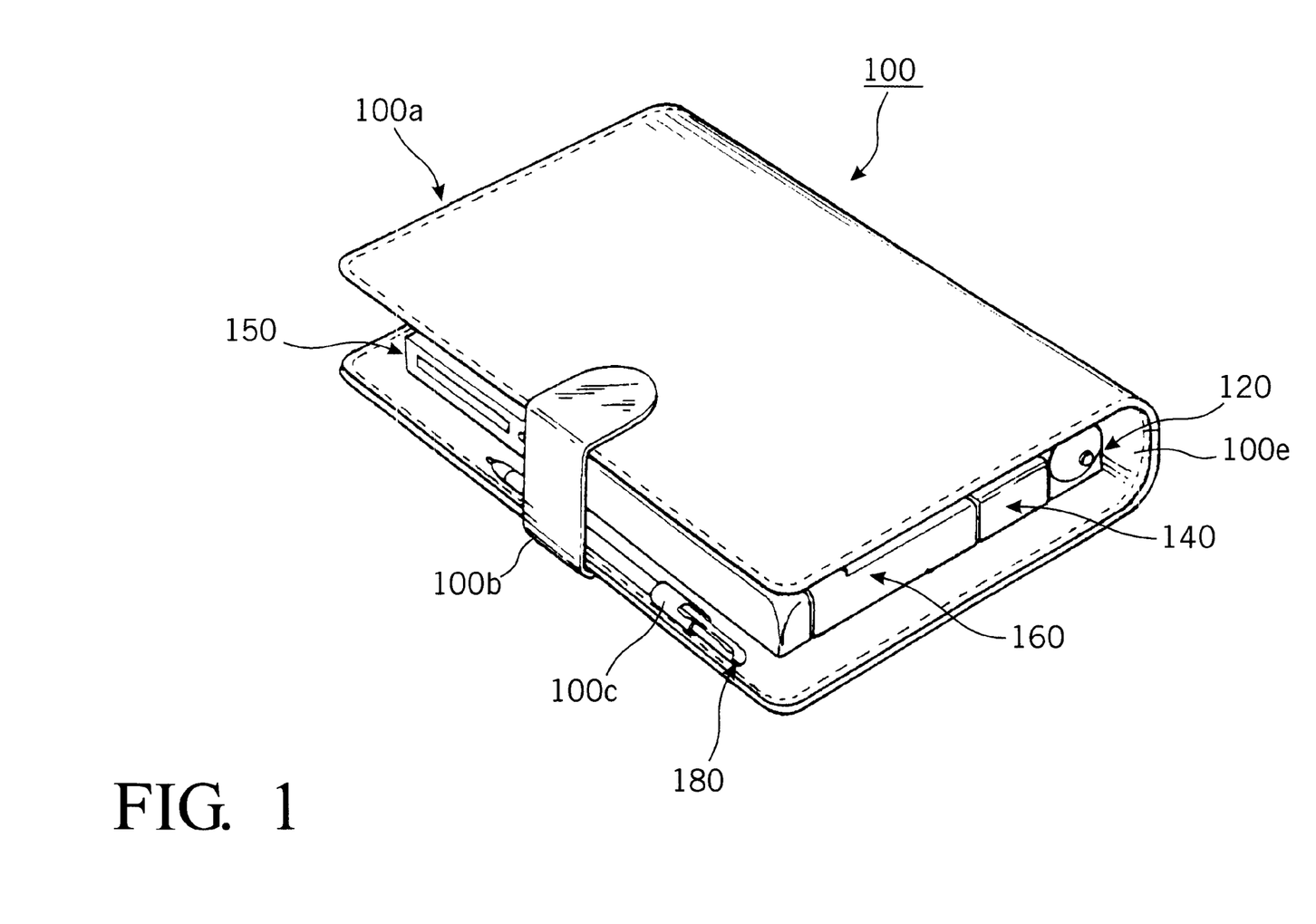
FIG. 1 is an overall perspective view of the book-shaped information terminal, in accordance with the principles of the present invention.

Turn now to FIG. 1, which is an overall perspective view of the book-shaped information terminal, in accordance with the principles of the present invention. Additionally, turn to FIG. 2, which is a view of the book-shaped information terminal illustrated in FIG. 1 partly disassembled, in accordance with the principles of the present invention.

Figure 2:
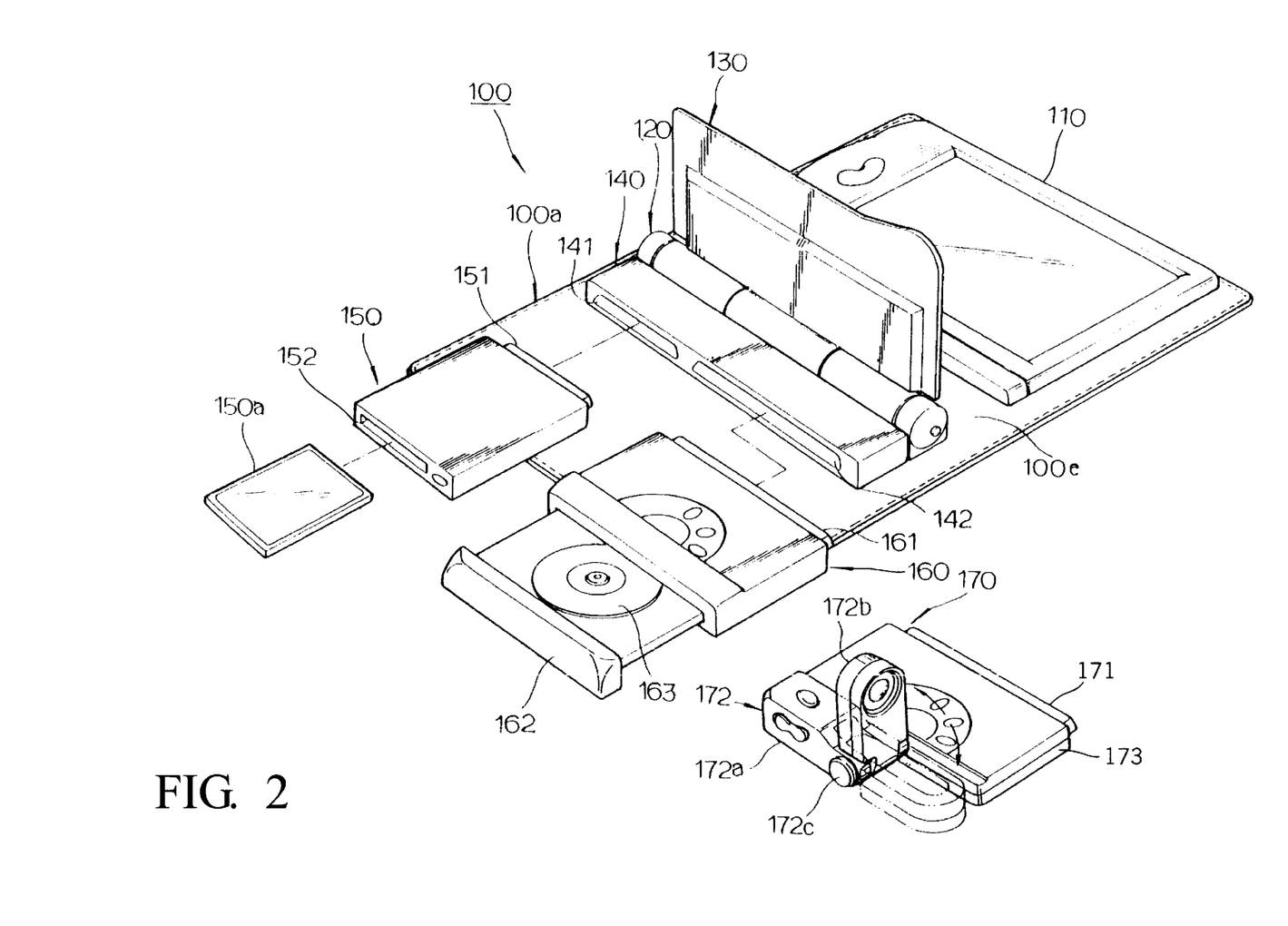
FIG. 2 is a view of the book-shaped information terminal illustrated in FIG. 1 partly disassembled, in accordance with the principles of the present invention.

As illustrated in FIGS. 1 or 2, a book-shaped information terminal 100 comprises an armoring cover 100a which forms an outside shape of the information terminal as a portable computer and can be opened and closed centering around a middle section, a thin film display unit attached and fixed to one side of said armoring cover 100a, a hinge part 120 attached and fixed to another side of the thin film display unit 110 attached and fixed to the armoring cover 100a, a keyboard 130 which is secured to the hinge part 120 and can be rotated while secured to the hinge part 120, and a main body 140 being rotatably secured to the hinge part 120.

The armoring cover 100a has a middle part which corresponds to a flexible member 100e. A writing tool-mounting member 100c, on which a writing-tool 180 can be mounted, is formed on one side of the armoring cover 100a. The main body 140 comprises a first female connection terminal 141 and a second female connection terminal 142 to connect auxiliary peripheral equipment.

On the first female connection terminal 141 formed in the main body 140, a flash card drive 150 having a male connection terminal 151 fitting to the first female connection terminal 141 is mounted. The flash card drive 150 has a slot 152 which receives a flash card 150a. Note that the flash card 150a can correspond to a Personal Computer Memory Card Industry Association (PCMCIA) card also known as a personal computer card (PC card), and the flash card drive 150 can correspond to a drive able to receive the PC card. The flash card 150a can also correspond to a card manufactured in accordance with the Miniature Card standard. The Miniature Card standard was developed by the Intel Corporation and was first released as version 1.0 on Feb. 29, 1996.

On the second female connection terminal 142, a digital video disk player (DVDP) 160 having a male connection terminal 161 fitting to the second female connection terminal 142. A digital video disk-read only memory (DVD-ROM) 163 is mounted on a digital video disk-read only memory (DVD-ROM) mounting part 162 of the digital video disk player (DVDP) 160.

A digital camera part 170 is so constituted as to be used to replace the digital video disk player 160. The digital camera part 170 has a male connection terminal 171 fitting to the second female connection terminal 142. The digital camera part 170 has a digital camera 172, a main body 172a, an optical device 172b, and a hinge 172c.

A new component (not illustrated) can be attached to the main body 140 at the terminal 142 which is not a digital video disk player (DVDP) 160 and is not a digital camera part 170. In addition, multiple components can be simultaneously attached to terminal 142 by the use of a first adapter (not illustrated). Also, multiple components can be simultaneously attached to terminal 141 by the use of a second adapter (not illustrated). The main body 140 can be designed to have extra terminals (not illustrated) in addition to the first terminal 141 and second terminal 142. Terminals such as terminals 141 and 142 can accommodate additional components such as a fax machine, printer, scanner, floppy disk drive, external hard disk drive, external monitor, mouse input device, track ball input device, numeric keypad, desktop computer, and other devices. In some instances, an adapter may be needed. In other instances, no adapter will be needed.

A more complete appreciation of the invention becomes better understood by reference to the following detailed description when considered in conjunction with the accompanying drawings. An armoring cover 100a is made of soft and hard leather and other components. The side on which the thin film display unit 110 and the main body 140 are mounted is so firm and hard that the thin film display unit 110 and the main body 140 can be supported. The flexible material part 100e, which is formed in the middle part between the thin film display unit 110 and the main body 140, is flexible in order to be folded or opened centering around a hinge part 120.

Figure 3:
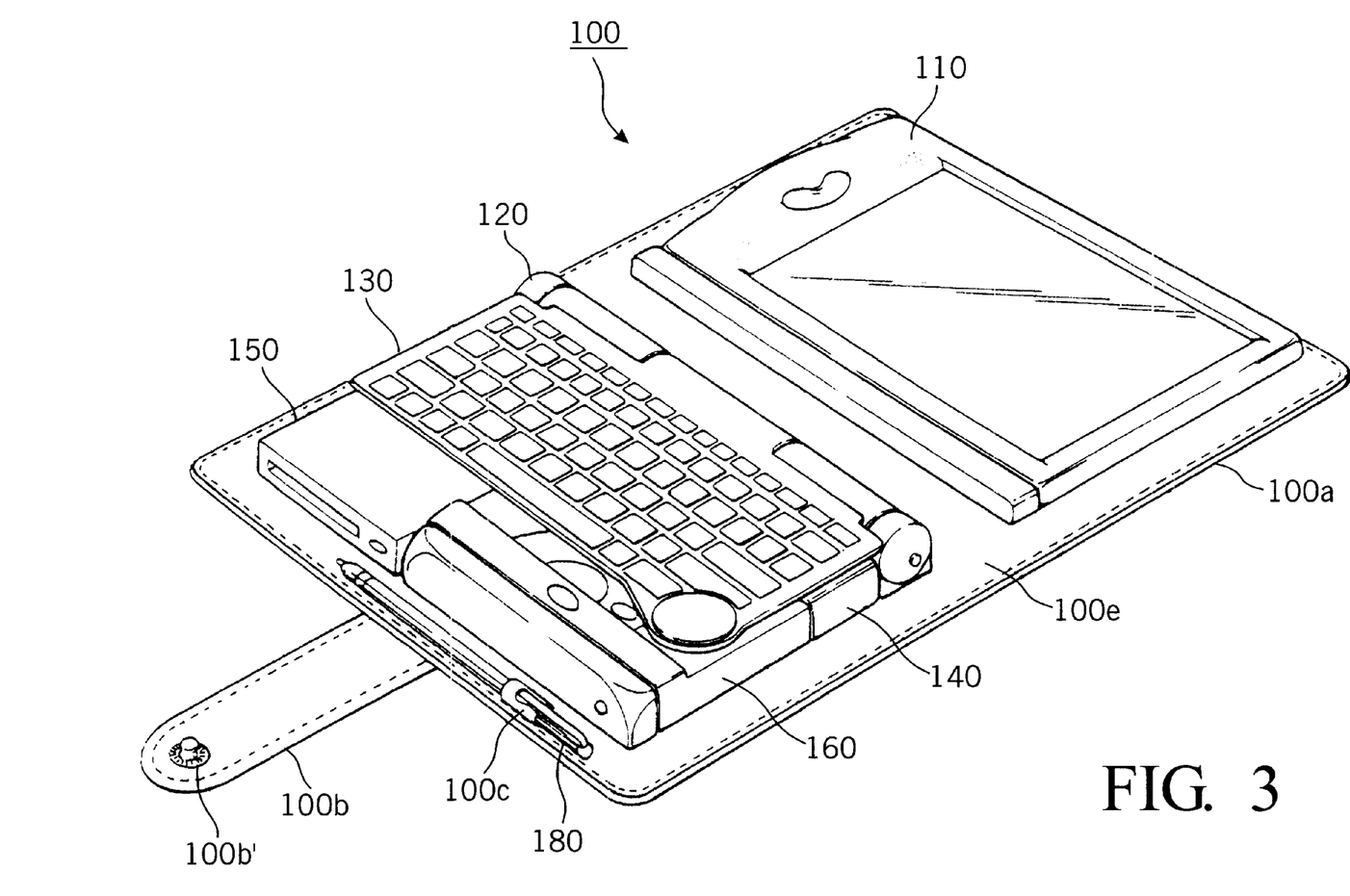
FIG. 3 is a view of the book-shaped information terminal illustrated in FIG. 2 assembled, in accordance with the principles of the present invention.

Turn now to FIG. 3, which is a view of the book-shaped information-terminal illustrated in FIG. 2 assembled, in accordance with the principles of the present invention. As shown in FIG. 3, there is a fixing means 100b' of a fixing member 100b of the armoring cover 100a which can be used to hold the book-shaped terminal 100 closed. The fixing member 100b is shown in FIGS. 1 and 3. Alternative methods can be used to hold the book-shaped terminal 100 closed including a zipper, a button, a clasp, a magnet, a clip, an elastic loop, and others.

The thin film display unit 110 for showing data occurring in the main body 140 can be secured to one side of the armoring cover 100a. A display panel (PDP) etc., which uses liquid crystal display (LCD) degauss or plasma, can be used in the thin film display unit 110. The display unit 110 can correspond to a cathode ray tube, liquid crystal display, gas-plasma display, light emitting diode display, electroluminescent display, field emission display, or other type of display. The main body 140 forms a main circuit board of a central processing unit (CPU) or a storing means.

When the thin film display unit 110 is attached, we fix and attach a hinge part 120 to the under-side of the thin film display unit 110 on the basis of the outside of a flexible member 100e formed in the middle part of the armoring cover 100a. The keyboard 130 is so mounted on the hinge part 120 attached and fixed to the armoring cover 100a to be rotated.

Figure 4:
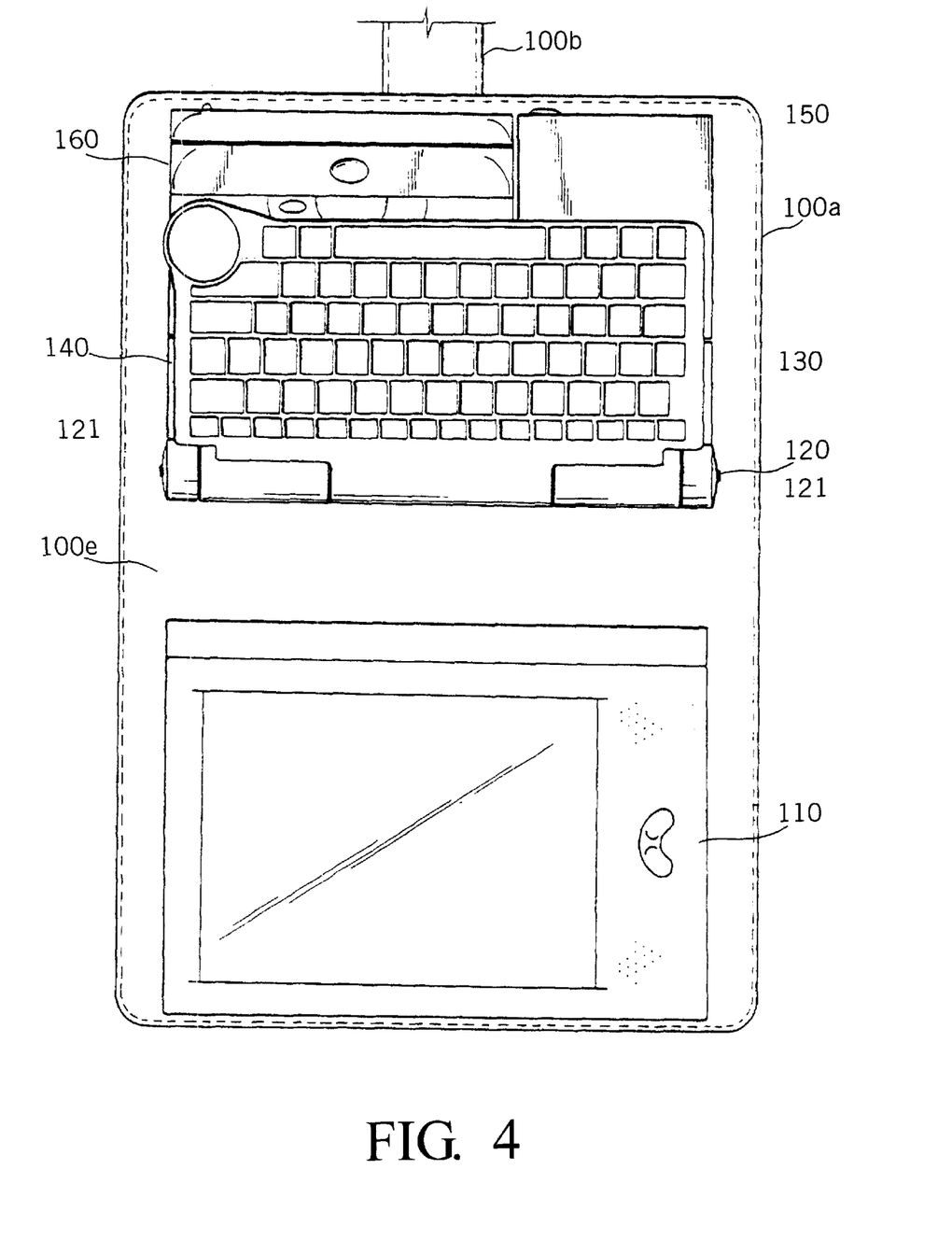
FIG. 4 is an additional view of the book-shaped information terminal illustrated in FIG. 3, in accordance with the principles of the present invention.

Turn now to FIG. 4, which is an additional view of the book-shaped information terminal illustrated in FIG. 3, in accordance with the principles of the present invention. The assembly of the keyboard 130 and the main body 140 proceeds as follows, after arranging a hole (not illustrated) formed for being fixed to the hinge part 120 each other horizontal, we insert a fixed device (not illustrated) in same size as the hole, and mount and assemble on the outside of the fixed device by using a secession prevention device 121.

The keyboard 130 and the main body 140 are designed to be fixed, in case of not giving the power, after rotating the keyboard 130 and the main body 140 with the limited power by forming size of the outside-diameter of the fixing part of the hinge part and a size of inside-diameter of a hole formed in the keyboard and the main body equal. If the keyboard 130 and the main body 140 are mounted on the hinge part 120 through this process, the flash card drive 150 is mounted on the first female connection terminal 141 formed in the main body 140.

The flash card drive 150 is mounted by combining the male connection terminal 151 and the first female connection terminal 141 formed in the main body 140, and handles, and transmits data stored in the flash card 150a to the main body 140 through a connection connector (not illustrated) formed in the male connection terminal 151 and the first female connection terminal 141. The main body 140 manifests a handling-result of data stored in the flash card 150a through operating and transmitting the transmitted data to the thin film display unit 110. Besides, the digital video disk player (DVDP) 160 or the digital camera part 170 is mounted on the second female connection 142 formed in the main body 150.

The digital video disk player (DVDP) 160 or the digital camera part 170 is mounted by combining the male connection terminal 161, 171 and the second female connection terminal 142, and the digital video disk-read only memory (DVD-ROM) 163 is mounted on a digital video diskread only memory (DVD-ROM) mounting part 162 of the mounted digital video disk player (DVDP) 160, or data occurred from the digital camera 171 are handled in the same process as data stored in the flash card 150a. Particularly, the digital camera 172 is used by rotating and removing an optical device to up and down positions and connecting a main body of a digital camera 172a and an optical device 172b to the hinge 172c. Like this, data occurred in an auxiliary peripheral equipment connected to main body 140 are transmitted to the main body unit 140 through each connection terminal.

Figure 5:
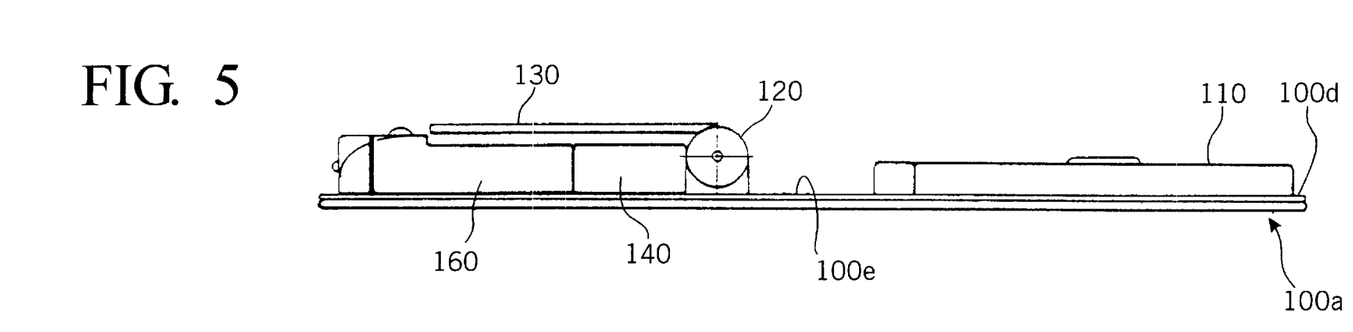
FIG. 5 is a side view of the book-shaped information terminal illustrated in FIG. 3, in accordance with the principles of the present invention.

Turn now to FIG. 5, which is a side view of the book-shaped information terminal illustrated in FIG. 3, in accordance with the principles of the present invention. A cable (not illustrated) for transmitting data occurring in the keyboard 130 from the keyboard 130 to the main body 140, or data occurring in the main body 140 from the main body 140 to the thin film display unit 110, is protected as in FIG. 5 by being formed in the inside of a cable protect cover 100d formed in the armoring cover 1000a with an established thickness.

Figure 6:
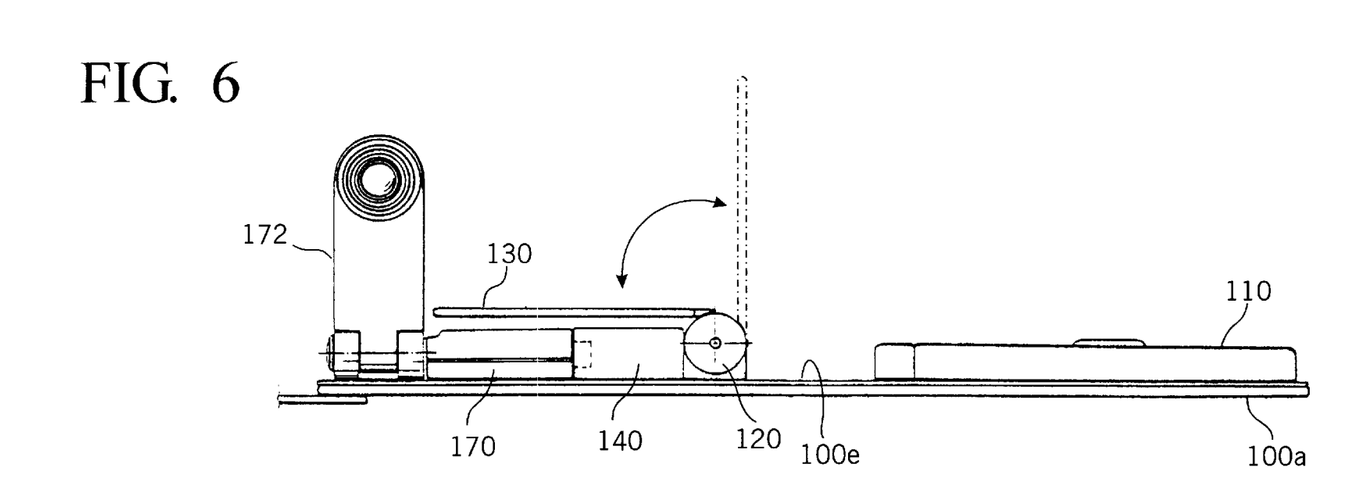
FIG. 6 is another side view of the book-shaped information terminal illustrated in FIG. 3, in accordance with the principles of the present invention.

Turn now to FIG. 6, which is another side view of the book-shaped information terminal illustrated in FIG. 3, in accordance with the principles of the present invention. Also turn to FIG. 7, which is a view illustrating features below a keyboard in the book-shaped information terminal illustrated in FIG. 3, in accordance with the principles of the present invention.

Figure 7:
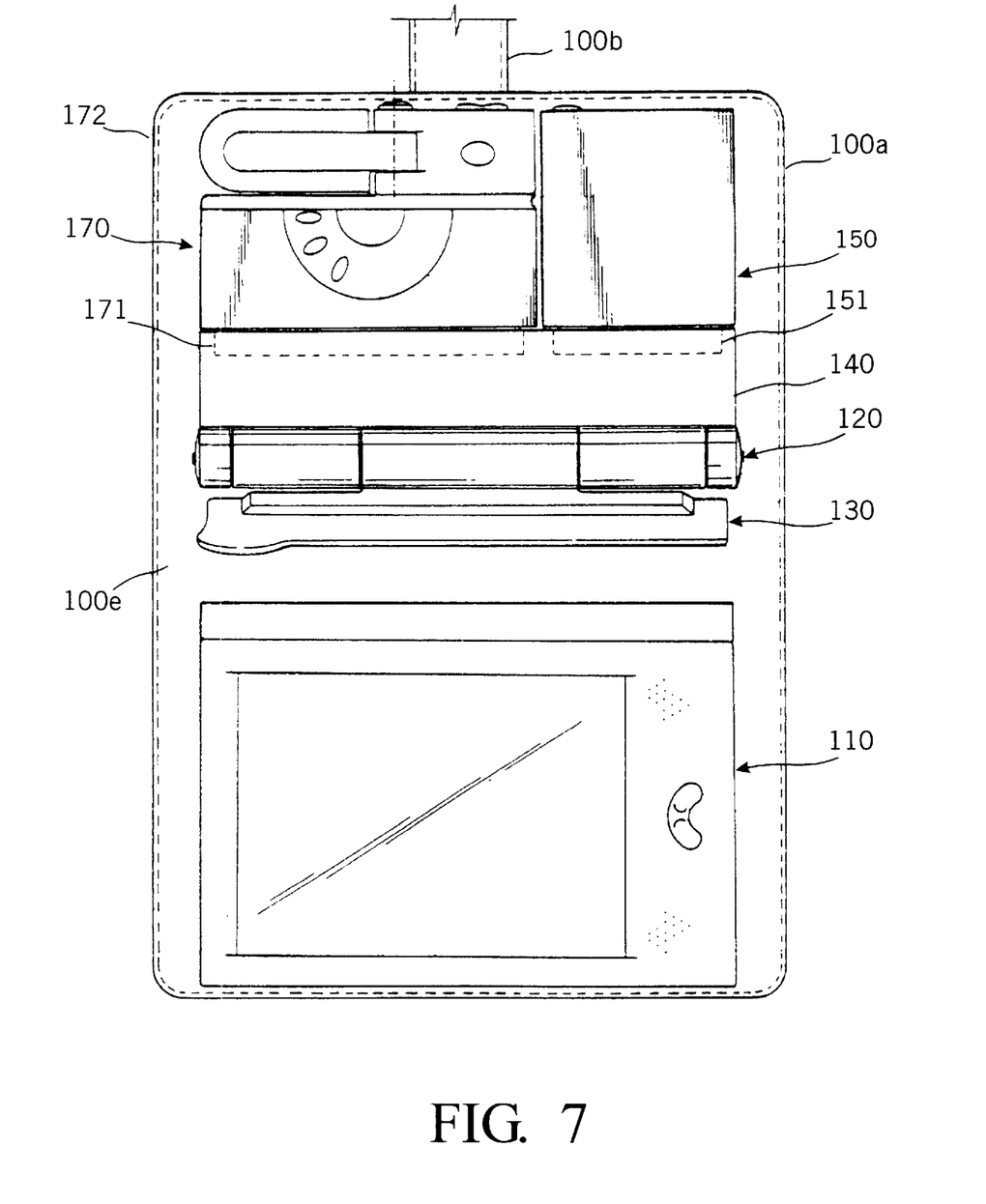
FIG. 7 is a view which illustrates features below a keyboard in the book-shaped information terminal illustrated in FIG. 3, in accordance with the principles of the present invention.

In FIGS. 6 or 7 there is illustrated an inner constitution of the information terminal 100 in the state where the keyboard 130 is rotated and fixed in 90 degrees of vertical direction centering around the hinge part 120. Because the main body 140 can be also rotated in the state, where the keyboard 130 is rotated and fixed in vertical direction, it can be mounted in the more convenient angle when the auxiliary peripheral equipment is mounted.

The book-shaped information terminal 100, so constituted as above described, can be carried by being fixed with the fixed member 100b, folded centering around the outside of the hinge part 120, in this time we can use by mounting the writing tool 180 on the writing tool mounting member 100c formed in one side of the armoring cover 100a.

As described above, the present invention has the advantage to give convenience to be able to use the portable computer as book-shaped more conveniently by constituting the information terminal as a portable computer in such form as a book.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A book-shaped information apparatus, comprising:

a cover having a first inside surface coupled to a second inside surface, said inside surfaces being aligned and facing each other when said cover is in a closed position, said inside surfaces not facing each other when said cover is in an open position;

a video display unit conveying varying visual information to a user, said video display unit being secured to said first inside surface of said cover;

a main unit processing data including the visual information, said main unit being secured to said second inside surface of said cover and being electrically coupled to said video display unit;

a hinge unit disposed between said main unit and said video display unit, said hinge unit being secured to said main unit; and a keyboard rotatably mounted to said hinge unit, wherein said keyboard can be rotated in a first direction toward said video display unit and can be rotated in a second direction toward said main unit.

2. The apparatus of claim 1, wherein said cover further comprises a flexible member formed at a location where said first inside surface is coupled to said second inside surface, said flexible member enabling said cover to be folded to place said cover in the closed position, and said flexible member enabling said cover to be unfolded to place said cover in the open position.

3. The apparatus of claim 1, wherein said cover consists of a leather material.

4. The apparatus of claim 1, wherein said cover further comprises a holding unit, said holding unit receiving and securing a writing utensil.

5. The apparatus of claim 1, wherein said main unit further comprises a first terminal and a second terminal, said first and second terminals enabling auxiliary peripheral equipment to be coupled to said main unit.

6. The apparatus of claim 5, wherein said first terminal of said main unit receives a flash card drive, enabling electrical communication between said flash card drive and said main unit.

7. The apparatus of claim 5, wherein said second terminal of said main unit receives a digital camera unit and enables electrical communication between said digital camera unit and said main unit.

8. The apparatus of claim 7, wherein said second terminal of said main unit additionally receives a digital video disk player unit and enables electrical communication between said digital video disk player unit and said main unit.

9. A book-shaped computer apparatus, comprising:

a cover having a first inside surface coupled to a second inside surface, said first and second inside surfaces being aligned and facing each other when said cover is in a closed position, said inside surfaces not facing each other when said cover is in an open position;

a video display unit conveying varying visual information to a user;

a system unit processing data including the visual information, said system unit being electrically coupled to said video display unit;

a flexible member formed at said cover in a location where said first inside surface is coupled to said second inside surface, said flexible member enabling said cover to be folded to place said cover in the closed position, and said flexible member enabling said cover to be unfolded to place said cover in the open position; and a hinge unit being mounted to said cover adjacent to said flexible member, said video display unit being rotatably mounted to said hinge unit such that said video display unit can be rotated in a first direction toward said first inside surface and can be rotated in a second direction toward said second inside surface, said system unit being rotatably mounted to said hinge unit such that said system unit can be rotated in said first and second directions independent of said video display unit.

10. The apparatus of claim 9, wherein said cover further comprises a polymer material located at outside surfaces of said cover.

11. The apparatus of claim 9, wherein said cover further comprises a holding unit, said holding unit receiving and securing a plurality of writing utensils and recordable media.

12. The apparatus of claim 9, wherein said video display unit is a device selected from among a cathode ray tube, a liquid crystal display, a gas-plasma display, a light emitting diode display, an electro-luminescent display, and a field emission display.

13. The apparatus of claim 9, further comprising a keyboard rotatably mounted to said hinge unit such that said keyboard can be rotated in said first and second directions independent of said video display unit and independent of said system unit, said keyboard being electrically coupled to said system unit.

14. The apparatus of claim 9, wherein said system unit further comprises a plurality of connectors including a first connector and a second connector, said plurality of connectors enabling auxiliary peripheral equipment to be coupled to said system unit.

15. The apparatus of claim 14, wherein said first connector receives a flash card drive, enabling electrical communication between said flash card drive and said system unit.

16. The apparatus of claim 14, wherein said second connector receives an auxiliary unit selected from among a digital camera unit and a digital video disk player unit and enables electrical communication between said auxiliary unit and said system unit.

17. An information apparatus, comprising:

a protective cover having a first inside surface and a second inside surface, said surfaces coupled to each other with a flexible member formed in said cover;

a video display unit conveying varying visual information to a user and being secured to said first inside surface of said cover;

a system unit processing data including the visual information and being secured to said second inside surface of said cover, said system unit being electrically coupled to said video display unit;

a hinge unit mounted to said system unit;

a keyboard rotatably mounted to said hinge unit and electrically coupled to said system unit; and a holding unit removably mounted to said cover, said holding unit receiving and securing a plurality of writing utensils and recordable media.

18. The apparatus of claim 17, wherein said system unit further comprises a plurality of electrical terminals receiving a plurality of auxiliary units, said electrical terminals enabling signals to be conveyed between said plurality of auxiliary units and said system unit.

19. The apparatus of claim 17, wherein said video display unit is a device selected from among a cathode ray tube, a liquid crystal display, a gas-plasma display, a light emitting diode display, an electro-luminescent display, and a field emission display.

20. The apparatus of claim 17, wherein said cover consists of a material including leather.

* * * * *